United States Patent Office 2,855,951
Patented Oct. 14, 1958

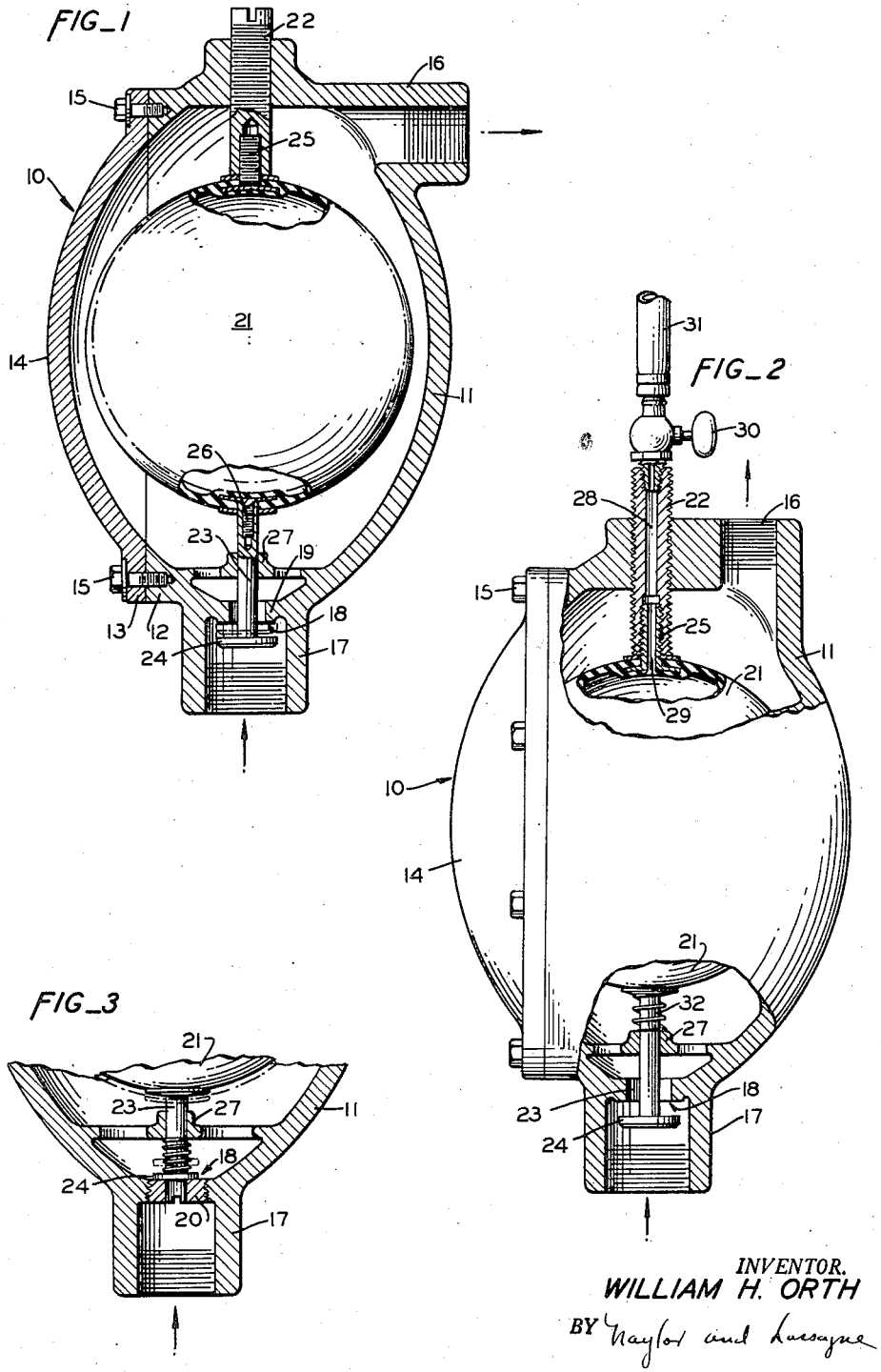

2,855,951
REGULATING VALVE
William H. Orth, San Carlos, Calif.

Application June 11, 1954, Serial No. 436,059

6 Claims. (Cl. 137—505.43)

The present invention relates to valves and more particularly to a fluid pressure regulating valve of the type adapted to utilize the pressure of the fluid as the controlling agent.

An object of the present invention is to provide an improved valve of the above general character in which a pressure-loaded resilient sphere or ball is disposed in the path of the fluid flowing through the valve and is adapted, in response to a differential between the pressure of the fluid and the pressure-load of the resilient ball, to directly actuate a valve stem to regulate the flow of fluid through the valve.

Another object of the invention is to provide a regulator valve of the above construction in which the pressure-load of the resilient ball may be quickly and easily regulated to vary the operating characteristics of the valve.

A further object is to provide a regulating valve of the above character which is of simple and sturdy construction, is economical to manufacture, and is highly efficient and sensitive in operation.

The above as well as further objects and advantages of the present invention will be more readily apparent from the following description of the accompanying drawings illustrating three possible embodiments of the invention; in which drawings:

Figure 1 is a vertical sectional view of a pressure regulating valve constructed in accordance with one embodiment of the present invention;

Figure 2 is a vertical view, partly in section, showing a modified embodiment of the valve shown in Figure 1; and Figure 3 is a sectional view of the valving portion of a regulating valve showing a further embodiment of the present invention.

Referring in detail to the drawings, wherein like reference characters denote corresponding parts throughout, as shown in Figure 1 the regulating valve includes a valve casing or housing, generally designated as 10, which is preferably of the form illustrated and consists of a body member 11 having a flange 12 which is secured in fluid-tight relation to the flange 13 of the capping member 14 by means of the screw bolts 15. The body member 11 has at its upper end portion an outlet opening 16, and at its lower end portion an inlet opening 17 in which there is provided a valve seat 18. This valve seat may be formed either as shown in Figure 1 on an annular flange 19 formed integral with the body member 11, or on a suitable annular member or ring 20 which is screwed into the inner end of the inlet opening 16 as in Figure 3.

Positioned within the casing 10 is a hollow sphere 21 which is made of a suitable resilient material such as rubber or the like and is filled with a compressible fluid under pressure as for example air or gas. Attached to the sphere 21 is an adjusting screw 22 which is threaded in the manner shown through the upper end of the body member 11, and oppositely disposed to and in axial alignment therewith is a valve stem 23 carrying a valve 24. Adjacent to the inlet opening 17 there is provided a webbed stem guide 27, which may be formed integrally with the body member 11, adapted to guide the stem 23 and to maintain the valve 24 in proper seating alignment with the valve seat 18.

The resilient properties of the sphere should be such as to permit, as will be described hereinafter, the sphere to readily expand or contract in response to a change in the pressure of the surrounding fluid in the housing 10; the adjusting screw 22 and valve stem 23 being secured or attached to such sphere in any suitable manner, as for example in the manner illustrated wherein opposite walls of the rubber ball are cast about the heads of the members 25 and 26, which members are provided with washers and threaded into the adjusting screw 22 and stem 23, respectively.

The general construction and arrangement of parts described above is particularly adapted for use as a household gas regulator for both manufactured and natural gas. In operation the resilient sphere 21 is adjusted by means of the adjusting screw 22 to position the valve 24 in normally open relation to the valve seat 18; the resilient sphere assuming under such conditions, that is, in relation to the pressure of the normal gas supply and the internal air pressure within the sphere, an overall size illustrated by the solid outline shown in Figure 1. When the gas supply pressure is then increased, the differential in pressure between the internal air pressure of the sphere and the pressure of the surrounding gas will cause the sphere to diminish in size to move the valve stem to the throttling position indicated in relief in Figure 1; thus regulating both the flow of gas through the valve as well as the outlet gas pressure.

The operating characteristics of the regulator may be quickly and easily regulated when necessary due to a change of conditions, or when otherwise desired, by means of the adjusting screw 22. For example should the regulator, when once inserted and adjusted in the gas supply line, be subject to an increase or decrease in the normal supply pressure of the gas, the sphere will accordingly be of proportionately smaller or larger size during normal operating conditions; and the regulator is conveniently and easily adjusted in accordance with the new operating conditions by inner or outer adjustment of the adjusting screw 22, without having to remove the regulator from the supply line. Likewise, when it is desired to change the regulating pressure at which the regulator responds to a pressure change in the supply pressure of the gas, the adjusting screw 22 may be similarly adjusted to increase or decrease the valve stem travel; an increase in stem travel resulting in an increase in the responsive operating pressure of the regulator.

In the modification shown in Figure 2, the internal pressure load of the sphere 21 may be regulated for the purpose of changing the operating characteristics of the regulator independently of adjustment of the adjusting screw 22. To do this the screw 22 and the member 24 are provided with passages 28 and 29 which communicate in the manner shown with the interior of the sphere 21 and a valve 30 attached to a high pressure air supply line 31. Such construction is of particular importance where the regulator is to handle fluids under relatively high pressures, as on the order of more than 50 lbs. and, if desired, an assist spring 32 may be provided on the stem 23 between the sphere 21 and the guide member 27 adapted to further assist the internal pressure loading of the sphere 21 and to reduce the tendency of the valve 27 to pop open when moved to a throttling position responsive to an increase in pressure in the fluid supply line.

In the foregoing construction, the pressure differential at which the valve will be caused to affect a throttling and control of the fluid supply to the regulator is regulated by controlling the internal pressure loading of the sphere in relation to the fluid supply pressure and the operating characteristics desired. When the regulator has been connected in a fluid supply line, the valve 30 is opened to permit the build-up of air under pressure in the interior of the sphere 21 to an operating pressure at which the sphere will, in relation to the normal fluid supply pressure flowing through the regulator, be expanded against the urge of the spring 32 to move the valve 27 to the desired open or normal operating position; at which pressure the valve 30 is then closed. Thus, when the pressure of the fluid supplied to the regulator is then increased, the pressure differential between the fluid supply pressure and the internal pressure load of the sphere will in the manner described hereinbefore, cause the sphere to diminish in size to regulate both the flow of fluid through the regulator and the outlet pressure thereof.

In Figure 3, the valve casing, fluid inlet and outlet openings, resilient sphere, and means for adjusting the internal pressure load of the sphere may be substantially the same as those described in connection with either of Figure 1 or 2. In this mechanism, however, the regulator is adapted to be used as a release or back pressure regulator. To do this, the action of the valve 24 is reversed such that the valve will be normally closed by the internal pressure loading of the sphere 21 and will be moved to an open position, as indicated in relief, when the pressure in the housing or fluid back pressure is increased.

As will be apparent from the foregoing description of the three modifications illustrated, the invention resides particularly in the novel position and arrangement of the resilient sphere and its associated parts within the valve casing whereby the sphere is adapted in response to a differential between the pressure of the fluid within the casing and the pressure load within the sphere to directly actuate the valve to regulate the flow of fluid through the valve. Such arrangement is, in view of the shape and resilient characteristics of the sphere, highly sensitive to pressure changes within the casing whereby a more uniform regulation of the pressure and flow of fluid through the valve may be maintained, such regulation being easily and quickly adjustable in accordance with a change in operating conditions. In accordance with these features, the invention is well adapted to accomplish among others all the objects and advantages herein set forth and it is believed that the foregoing description of the three illustrated modifications of the invention sufficiently disclose the essential features of the invention to enable others, by applying current knowledge, to readily adapt it to various and specific applications.

What is claimed is:

1. In a fluid regulator including a casing having inlet and outlet openings, a valve seat in one of said openings, a movable valve member operable in relation to said valve seat for controlling the flow of fluid through the regulator, and means responsive to the pressure of the fluid in said casing adapted to actuate said movable valve member; the improvement wherein said pressure responsive means for actuating the valve member comprises a resilient pressure loaded sphere disposed within said casing in the path of flow of fluid therethrough and connected to the movable valve member, a screw attached to said sphere and threaded into a seat in the casing, said screw being oppositely disposed to and in axial alignment with said valve member, and means for adjusting said sphere externally of said casing to regulate the valving action of said movable valve member, whereby said sphere will expand or contract responsive to a change in pressure of the fluid within said casing to regulate the flow of fluid through the regulator.

2. A fluid regulator according to claim 1 wherein the sphere is adjusted corresponding to the normal pressure of the fluid in the casing by adjustment of the screw in the casing to move and position the valving member with respect to the valve seat such that the sphere will expand or contract responsive to a change in pressure within the casing corresponding to the operating characteristics desired.

3. A fluid regulator according to claim 2 wherein the sphere is adjusted independently of adjustment of the screw by varying the internal pressure loading of the sphere corresponding to the normal pressure of the fluid flowing through the regulator to move and position the valving member with respect to the valve seat in accordance with the operating characteristics desired.

4. A fluid regulator according to claim 3 wherein the internal pressure loading of the sphere is regulated by supplying air under pressure through the screw to the interior of the sphere.

5. A fluid regulator comprising in combination a casing having inlet and outlet openings, a valve seat in one of said openings, a longitudinally movable valve member operable in relation to said valve seat for controlling the flow of fluid through the regulator, for actuating the valve member, a resilient pressure responsive sphere disposed within said casing in the path of flow of fluid therethrough and connected to the movable valve member, a screw attached to said sphere and threaded into a seat in the casing, said screw being oppositely disposed to and in axial alignment with said valve member, and means for adjusting said sphere externally of said casing to regulate the valving action of said movable valve member, whereby said sphere will expand or contract responsive to a change in pressure of the fluid within said casing to regulate the flow of fluid through the regulator.

6. A fluid regulator comprising in combination a casing having inlet and outlet openings, a valve seat in one of said openings, a longitudinally movable valve member operable in relation to said valve seat for controlling the flow of fluid through the regulator, for actuating the valve member a resilient pressure loaded sphere disposed within said casing in the path of flow of fluid therethrough and connected to the movable valve member, a shaft carried by said sphere and attached to said casing, said shaft being oppositely disposed to and in axial alignment with said valve member, and means for varying the internal pressure loading of the sphere corresponding to the normal pressure of the fluid flowing through the regulator to move and position the valving member with respect to the valve seat, whereby the sphere will expand or contract responsive to a change in the normal pressure of the fluid within the casing to regulate the flow of fluid in accordance with the operating characteristics desired.

References Cited in the file of this patent

UNITED STATES PATENTS

| Re. 23,333 | Mercier | Jan. 23, 1951 |
| 942,360 | Wilkins | Dec. 7, 1909 |
| 1,178,528 | Loepsinger | Apr. 11, 1916 |
| 1,658,951 | Stitt | Feb. 14, 1928 |
| 2,320,886 | Quiroz | June 1, 1943 |
| 2,342,356 | Mercier | Feb. 22, 1944 |